US008276363B2

(12) United States Patent
Seely et al.

(10) Patent No.: US 8,276,363 B2
(45) Date of Patent: Oct. 2, 2012

(54) METHOD FOR COMPENSATING FOR COMBUSTION EFFICIENCY IN FUEL CONTROL SYSTEM

(75) Inventors: William Forrester Seely, Taylors, SC (US); Michael John Hughes, Greer, SC (US)

(73) Assignee: General Electric Company, Schenectady, NY (US)

( * ) Notice: Subject to any disclaimer, the term of this patent is extended or adjusted under 35 U.S.C. 154(b) by 137 days.

(21) Appl. No.: 12/854,161

(22) Filed: Aug. 10, 2010

(65) Prior Publication Data

US 2012/0036861 A1     Feb. 16, 2012

(51) Int. Cl.
*F02C 9/26* (2006.01)
(52) U.S. Cl. ........... 60/243; 60/39.281; 60/773; 60/778; 60/39.24; 60/39.27

(58) Field of Classification Search .................... 60/243, 60/39.281, 772, 773, 778, 39.24, 39.27
See application file for complete search history.

(56) References Cited

U.S. PATENT DOCUMENTS

| 4,470,118 | A * | 9/1984 | Morrison ....................... 701/100 |
| 5,857,321 | A * | 1/1999 | Rajamani et al. ............. 60/39.27 |
| 6,715,277 | B2 * | 4/2004 | Zagranski et al. ......... 60/39.281 |
| 7,681,401 | B2 | 3/2010 | Ziminsky | |
| 2009/0101109 | A1 | 4/2009 | Bauer | |
| 2009/0272118 | A1 | 11/2009 | Alexander | |

* cited by examiner

*Primary Examiner* — William H Rodriguez
*Assistant Examiner* — Steven Sutherland
(74) *Attorney, Agent, or Firm* — Cantor Colburn LLP

(57) ABSTRACT

Compensation is provided for a fuel demand signal of a gas turbine controller during transition between operating modes. The compensation adjusts fuel demand to account for combustion efficiency differences between the starting and ending operating mode that otherwise can lead to severe swings in combustion reference temperature and lean blowout.

10 Claims, 4 Drawing Sheets

METHOD FOR COMPENSATING FOR COMBUSTION EFFICIENCY IN FUEL CONTROL SYSTEM

BACKGROUND OF THE INVENTION

The invention relates generally to operation of gas turbines and more specifically to control of fuel supplied to the gas turbine during transition between turbine operating modes.

Industrial and power generation gas turbines have control systems with controllers that monitor and control their operation. These controllers govern the combustion system of the gas turbine, controlling various modes of operation from cold startup through base load. In addition to operating the gas turbine to maintain safe and effective base load operation while avoiding combustion boundaries, the controller must maintain gas turbine emissions compliant with government regulations and contractual obligations and at the same time promote efficient power output.

The control functions of the controller may vary between different types of gas turbines but may include functions related to startup control, acceleration control, speed control, generator load control, compressor control, exhaust temperature control, inlet guide vane control, emissions control and fuel control, among others. Fuel control is a reference from the controller and feedback of the fuel control valves. A fuel demand reference (sometimes referred to as fuel stroke reference) is determined by various turbine parameters such as speed and temperature as called for in various the modes of turbine operation.

The startup of the gas turbine includes transition through a number of stages associated with increasingly higher load and operating temperatures, as fuel staging is modified. Table I illustrates typical modes of fuel staging for one type of gas turbine by General Electric.

TABLE I

MODES OF FUEL STAGING

MODE 1
MODE 2
MODE 3
MODE 4
MODE 5
MODE 6

Fuel flow scheduling may include requirements for a combustion reference temperature achieving designated values appropriate to a particular fuel scheduling/burner operation. Plant control algorithms may also enforce this operation within designated boundaries for combustion reference temperature and other parameters.

Traditional gas turbine controls assume constant combustion efficiency throughout the different modes of gas turbine operation. However, in transient transfers between gaseous combustion modes and certain low-load operation points, it is possible for combustion efficiency to change quickly in a short period. This change causes several problems in the operation of a combustion turbine, including failed gaseous mode transfers and oscillations in fuel control. Accordingly, it would be desirable to provide systems and methods to avoid such problems during mode transfers.

BRIEF DESCRIPTION OF THE INVENTION

Briefly in accordance with one aspect of the present invention, a method is provided of compensating for combustion efficiency in a fuel control system for a gas turbine system, including a compressor, combustion system and turbine, with a turbine control system employing a mode logic for controlling operational parameters of the gas turbine system from startup through base load operation. The system provides a fuel demand signal to a fuel control system according to a controller of the turbine control system. The method includes providing encoded information in a turbine control system for combustion efficiency in a plurality of combustion modes based on at least one reference parameter. The method also includes sensing a combustion mode transfer from a starting combustion mode to an ending combustion mode. A calculation is made for a combustion efficiency signal for operating conditions under the starting combustion mode for the gas turbine and for a combustion efficiency signal for operating conditions under the ending combustion mode. The method biases the fuel demand signal to a fuel control system according to an algorithm whose technical effect is to correct for combustion efficiency according to combustion mode.

According to another aspect of the present invention, a gas turbine system with operating modes is provided. The gas turbine system includes a compressor, combustion system and a turbine; and a turbine control system employing a mode logic for controlling operational parameters of the gas turbine system from startup through base load operation. The gas turbine system also includes a fuel control system. The turbine control system provides the fuel demand signal to the fuel control system. Information is encoded in the turbine control system for combustion efficiency in a plurality of combustion modes based on at least one reference parameter. The turbine control system includes a calculation for a combustion efficiency signal for operating conditions under a starting combustion mode for the gas turbine and a calculation for a combustion efficiency signal for operating conditions under an ending combustion mode for the gas turbine. The turbine control system provides a bias to the fuel demand signal according to an algorithm whose technical effect is to correct the fuel demand signal for combustion efficiency according to combustion mode.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including allowing gas turbine combustors to run up to base load under gas fuel with mode transfers conducted at the target condition, regardless of differences in combustion efficiency. Mode transfers at the target temperature avoids operation outside of the safe and desirable operational range of each mode. Operation outside the safe and desirable range can have undesirable traits, such as high combustion component temperatures, combustion dynamics, or increased emissions. As a result of conducting mode transfers at the target temperature, a gas turbine combustor may run to base load while avoiding these undesirable operating traits.

Efficient operation of a gas turbine requires that a number of critical turbine operating parameters be processed to determine optimal settings for controllable parameters such as fuel flow and distribution and intake airflow. Such operating parameters include compressor inlet and outlet temperatures and pressures, exhaust temperature and pressure and the like. Control of the power generated by a gas turbine is typically exercised through control of the fuel flow into the combustor and airflow into the compressor.

One example of a control system for a gas turbine is the General Electric Co.'s Speedtronic™ Mark Series Control System. The control system is designed to fulfill all gas turbine control requirements, including speed and load control functions, which act to control fuel flow under part-load conditions and temperature control which limits fuel flow to a maximum consistent with achieving rated firing temperatures, and controls air flow via the inlet guide vanes.

Figure 1:
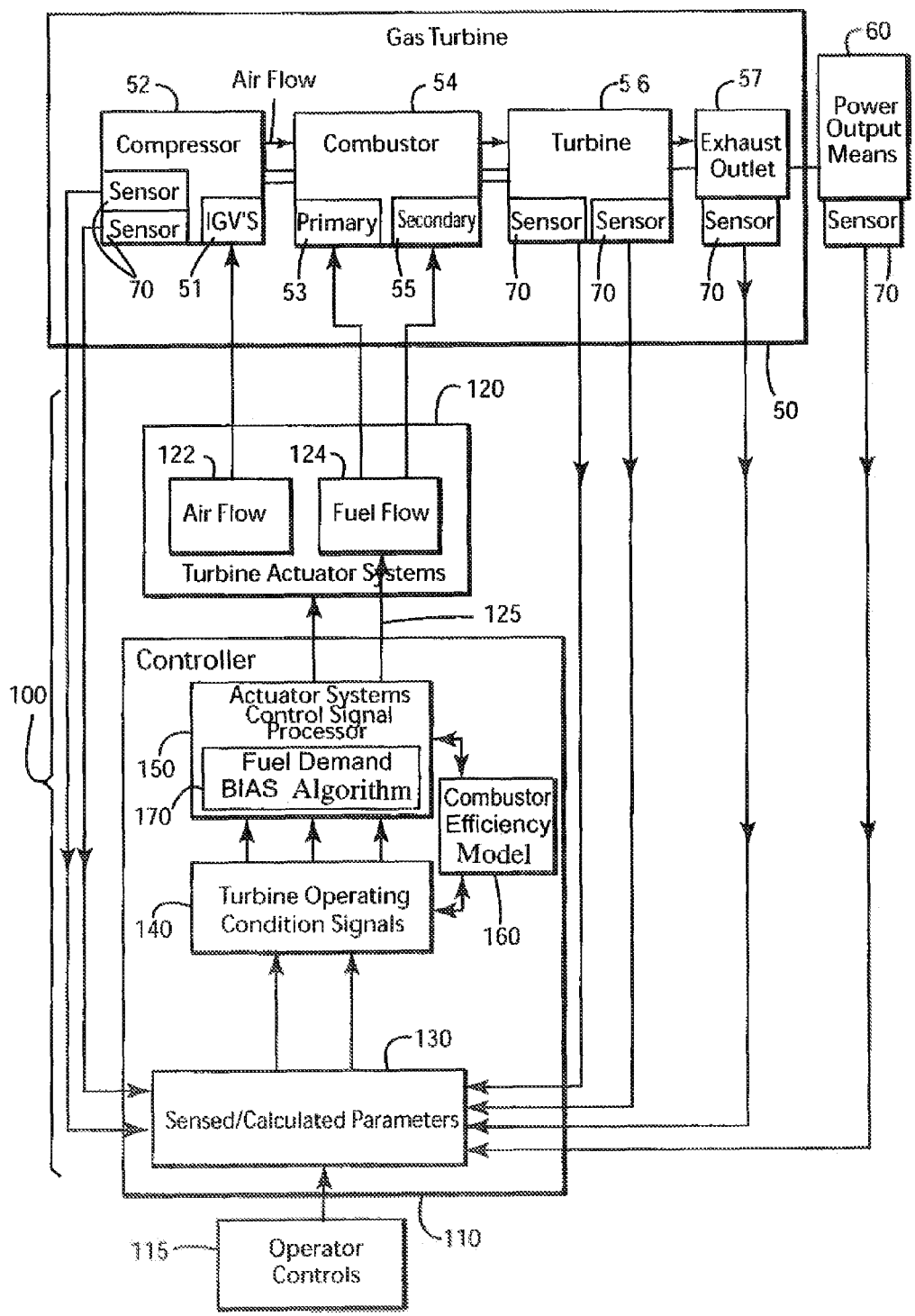
FIG. 1 illustrates an exemplary gas turbine with a turbine control system.

An exemplary turbine gas control system 100 is shown in the block-diagram of FIG. 1. This control system is disclosed in greater detail in U.S. Pat. No. 5,857,321, the disclosure of which is incorporated herein by this reference. The gas turbine control system 100 is coupled to a gas turbine 50 to govern the operation of the turbine. The gas turbine 50 typically comprises a compressor 52, a combustor 54, a turbine section 56, and an exhaust outlet 57. Gas turbine 50 is further typically coupled to a power output means 60, such as an electric generator, that is driven by turbine 50.

Control system 100 comprises a controller 110 that is coupled to receive input from a plurality of sources, such as operator controls 115 and a plurality of sensors 70 coupled to turbine 50 and power output means 60. Controller 110 typically comprises an electronic processor adapted to generate a plurality of control signals in response to the plurality of input signals processed. As used herein, "adapted to" and the like refers to a device that comprises the circuitry and programming to enable the processing of signals representing turbine operating parameters in accordance with selected functions that enable the generation of a desired command to control turbine operation. Generating signals "in response to" or "in correspondence with" typically refers to processing the signals in accordance with a predetermined function that represents the relation between one or more parameters, and is typically represented by mathematical equations.

Controller 110 may comprise one or more electronic-type processing devices, such microprocessor chips, application-specific integrated circuits, signal conditioning circuitry, or the like. Alternatively, optical signal processors can be used in some applications for control of systems in which data are transmitted by means of optical energy.

Controller 110 is coupled to a system of turbine actuators 120 that are used to maintain or establish a particular turbine operating regime. By way of example and not limitation, actuator systems 120 typically comprise an air flow control actuator 122 and a fuel flow actuator 124. Air flow actuator 122 comprises a device for controlling air flow into compressor 52, such as a positioning control for inlet guide vanes 51. Similarly, fuel flow actuator 124 comprises one or more devices for controlling fuel flow to the combustor, such as valves for throttling fuel flow into combustor 54. In some, but not all combustors, such fuel flow may be controlled by a primary zone fuel control valve 53 and also a secondary zone fuel control valve 55. Controller 110 can also be coupled to additional actuating systems.

Controller 110 is coupled to receive signals from the plurality of sensors 70 that in turn are coupled to gas turbine 50 and load 60. Such sensors typically comprise temperature sensors, pressure sensors, flow sensors, humidity sensors, speed sensors, flame detector sensors, valve position sensors, guide vane angle sensors, or the like that sense various parameters pertinent to the operation of gas turbine 50. As used herein, "parameters" and similar terms refer to items that can be used to define the operating conditions of turbine 50, such as temperatures, pressures, and flows at defined locations in the turbine that can be used to represent a given turbine operating condition. Sensors 70 are typically coupled to controller 110 via a sensed parameters coupling device 130 such as a terminal board or the like.

Controller 110 further comprises processing means 140 for representing turbine operating conditions, such as with electrical signals that are representative of selected turbine operating parameters. Such turbine operation condition signals may be directly sensed, such as selected temperatures or pressures, or alternatively, may comprise calculated values (that is, determined from models embedded in controller 110 processor programming) for operating conditions parameters that are either difficult (or impossible) to directly measure (or sense). Commonly, turbine operating condition parameters that are calculated represent internal cycle parameters of the turbine, that is, values that are not directly measurable, but that can be represented (at least over a narrow range of sensed input values) by mathematical models representing sets of non-linear equations.

One such internal operating parameter of the turbine that is calculated is a combustion reference temperature. The combustion reference temperature, while not representing a particular physical temperature in the turbine is related to the heat production in the combustor and is nevertheless an important control variable that governs a number of critical functions. For example, the combustion reference temperature correlates well with the average fuel-air-ratio in the combustor and hence is used to control the division of fuel going to various parts of the combustor.

Turbine operating condition signals 140 are in turn coupled to an actuator system control signal processor 150 for generating control signals to turbine actuator systems 120 in correspondence with the turbine operating condition signals, for implementing the pre-programmed or input control strategy. For example, a fuel demand signal 125 may be provided the fuel control system 124 of turbine actuator 120. Such a fuel demand signal 125 may be provided as a fuel stroke reference.

In accordance with aspects of the present invention, controller 100 may further include a numerical model 160 for combustion efficiency and a fuel demand bias or multiplier algorithm 170 assisting in compensating fuel demand control signal 125 for combustion efficiency variations in transitions between turbine operating modes, as will be described in greater detail below.

A combustor may operate more or less efficiently dependent on the combustor's mode of operation. The combustor may house multiple sets of fuel nozzles where the different sets of nozzles have different characteristics and performance. According to the various modes of turbine operation, some sets of nozzles may provide fuel while others are idle and some, none or all nozzles within the same set may provide fuel. Consequently, the pattern and location of fuel being delivered in the combustor will vary and influence the combustion efficiency. The difference in combustion efficiency between two combustion modes can be large at low combustion reference temperatures, and tends to shrink at higher combustion reference temperatures. This results in a large transient drop in combustion reference temperature when a starting mode for a mode transfer has a high combustion efficiency and an ending mode has a low combustion efficiency, or a large spike when performing the opposite transfer. A drop in temperature can lead to lean blow out in the combustor, or a loss of power generation if the turbine drops below zero megawatts (forcing the generator breaker to open). A spike in temperature can propagate to the exhaust and lead to a turbine shutdown due to excessive exhaust temperature.

Without the use of combustion efficiency compensation, these issues can only be avoided by transferring at higher temperatures where the combustion efficiency difference between the starting and ending mode is smaller. This introduces a new problem, as gaseous combustion modes can have undesirable traits outside the safe and desirable range of their operation. Operation outside of the safe and desirable range the combustor can experience high component temperatures, combustion dynamics, or increased emissions.

Figure 2:
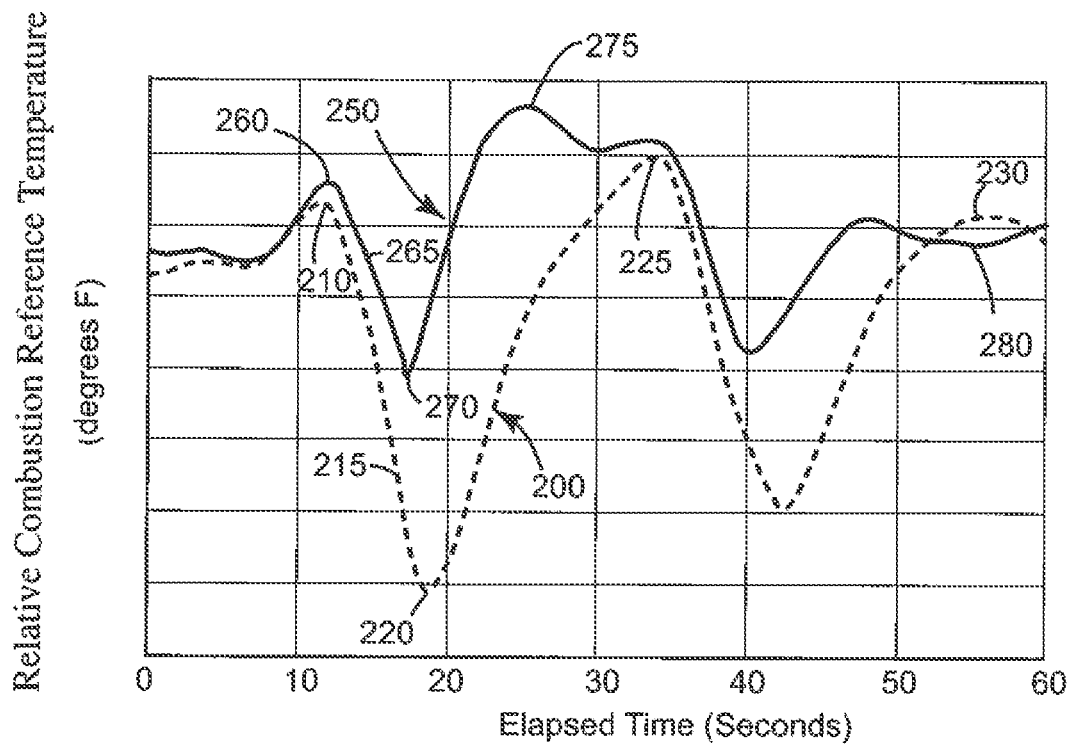
FIG. 2 illustrates plots of turbine reference temperature versus time during a mode transfer from a more efficient starting mode to a less efficient ending mode, with existing turbine controls and also with an embodiment of an algorithm for compensating for mode efficiency during transfers.

FIG. 2 illustrates a plot of turbine reference temperature versus time during mode transfers with a gaseous fuel. The plot includes one curve 200 illustrating a transfer from a more efficient starting mode to a less efficient ending mode under existing turbine control system under an existing turbine control system. The plot also includes another curve 250 illustrating a transfer from a more efficient starting mode to a less efficient ending mode but compensated by a combustion efficiency algorithm according to an embodiment of the present invention.

The uncompensated mode transfer to a less efficient ending mode, results in a lower power output in the ending mode from the fuel demand called for by the fuel control system than had existed in the more efficient starting mode. Consequently, for the same initial fuel demand, less power output is provided immediately after the transfer. With less energy being developed in the combustors, turbine reference temperature may drop precipitously, dependent on the magnitude difference of combustion efficiency between the modes. Ultimately in the ending mode, the control system will regulate fuel demand to supply an appropriate amount of fuel to the combustors to establish the scheduled combustion reference temperature for the ending mode. However, transiently, if the temperature drop due to the initial power drop is sufficiently great, a lean blowout may result. A previous approach to avoid combustion reference temperature from dropping too low during such transfers has been to maintain combustion reference temperature at an artificially high value for steady-state operation. However, these high combustion reference temperatures are known to produce undesirably high gas turbine emissions.

Referring to FIG. 2, initially on a mode transfer, a prefill of fuel lines to nozzles of the combustor leads to a small initial increase 210 in power and combustion reference temperature. With the shift to the less-efficient ending combustion mode, less power is produced resulting in a significant drop in turbine reference temperature 215. The lower turbine reference temperature urges the system controller to provide an increased fuel demand, which helps to turn the turbine reference temperature 220 and then drive it up. The turbine reference temperature then overshoots 225 on the high end. The transient cycles and smoothes out 230 with time at the turbine reference temperature called for in the ending mode.

According to an aspect of the present invention, a system and method are provided for compensating for combustion efficiency variations between gas turbine operating modes so as to allow steady-state combustion reference temperature to be established within a desirable range from an emissions standpoint, while at the same time avoiding a lean blowout during mode transfers from a more combustion efficient starting mode to a less efficient ending mode. Combustion reference temperature overshoots for transients from a less efficient starting mode to a more efficient ending mode are also damped.

Reference data may be prepared that includes combustor efficiency as a function of a turbine reference parameter for each mode of operation. The turbine reference parameter may be the combustion reference temperature. The reference data may be incorporated into a memory of the controller 110 within the turbine control system 100 as a lookup table 160, a transfer functions or other known means for accessing such data. Such models may be static or self-tuning. The numerical model storing the encoded information in a turbine control system for combustion efficiency may take, as input, parameters that are physically meaningful to the combustion system or gas turbine cycle are determinant of combustion system performance. Parameters could include, but are not limited to, compressor discharge temperature, fuel nozzle equivalence ratio, combustor residence time, combustor exit temperature, combustion severity parameter, nozzle injection pressure ratio, gas fuel temperature, pilot fuel split, or fuel nozzle unmixedness.

For each combustion mode, the combustion efficiency ($\eta$) may be determined at several steady state-points. When a mode transfer is detected through the standard operational logic, the algorithm receives the starting and ending modes that will be used to access the lookup tables or transfer functions. During the gaseous mode transfer, a predicted combustion efficiency $\eta$ is ramped between the predicted efficiency in each mode based on the progress of the transfer. This calculated predicted combustion efficiency is used to bias fuel demand signal to a fuel control system according to an algorithm whose technical effect is to correct for combustion efficiency according to combustion mode. One embodiment of the bias may be a factor of $1/\eta$, such that the amount of fuel that will actually be consumed at the nozzle is 100% of the requested amount.

When a transfer is initiated between a starting mode and a ending mode, a fuel demand parameter is compensated for the efficiency difference of the ending mode at the combustion reference temperature using the reference data stored in memory. In a transient from a more efficient starting mode to a less efficient ending mode, the effect is to provide additional fuel that will tend to support energy generated in the combustor, limiting the above-described drop in combustion reference temperature and increasing a margin to lean blowout.

Figure 3:
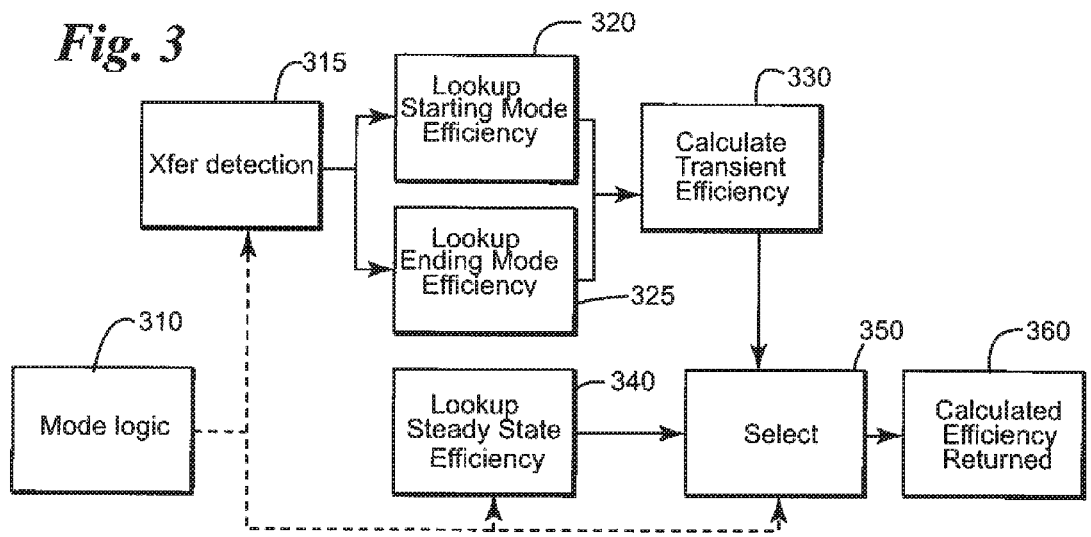
FIG. 3 illustrates an algorithm for calculation of combustion efficiency according to an embodiment of the present invention.

FIG. 3 illustrates an algorithm for calculation of combustion efficiency according to an embodiment of the present invention. Turbine control systems include a turbine operating mode logic 310 that defines when and under what circumstances transfers 315 between turbine operating modes may occur. When a transfer is initiated, either by operator action or automatic turbine control, information is provided as to the first (starting) mode and the second (ending) mode. A lookup 320 is then performed from the reference data as to the combustion efficiency for the starting mode and a lookup 325 is performed for the combustion efficiency for ending mode based on the combustion reference temperature. With respect to fuel demand, the mode transfer may incorporate a change of nozzles and amount of flow to each of the nozzles. Flow may be reduced in some nozzles and increased in other nozzles generally as a ramp down for the flow reduction and a ramp up for the flow increase. During the transition state, the fuel flow represents a changing state from a fuel flow condition of the starting mode to the fuel flow condition for the ending mode. In this transition state, the starting mode efficiency is accessed from the model for the starting mode and an ending mode efficiency is accessed from the model for the ending mode. In one embodiment, a weighted transient efficiency 330 may be calculated based on how far the mode transfer has progressed. If the transfer has progressed 10 percent, for example, then the transient efficiency may be calculated as $\eta_{transient} = 0.9 \eta_{starting\ mode} + 0.1 \eta_{ending\ mode}$. If the transfer has progressed 90 percent, for example, then the transient efficiency may be calculated as $\eta_{transient} = 0.1 \eta_{starting\ mode} + 0.9 \eta_{ending\ mode}$. The $\eta_{transient}$ calculation may be repeated through the course of the transfer and the transient efficiency value may be used to correct a fuel demand signal to the fuel control system. For steady-state operation within a mode, the combustion efficiency $\eta_{steady\ state}$ is looked up from the reference data 340 for the current mode. The calculated 360 efficiency value is selected 350 from the transient efficiency or steady state efficiency according to the operating condition provided from the mode logic 310.

Figure 4:
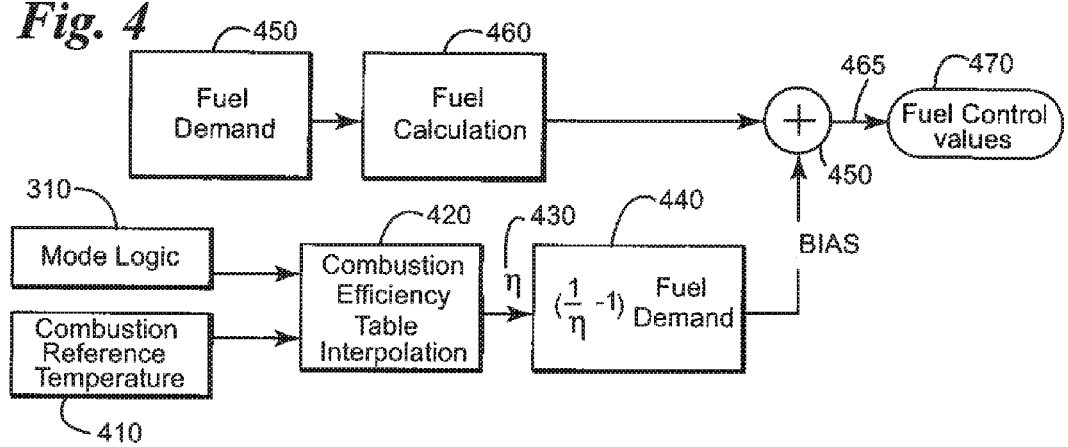
FIG. 4 illustrates use of combustion efficiency $\eta$ as a bias signal to modify the fuel demand signal in an embodiment of the present invention.
Figure 5:
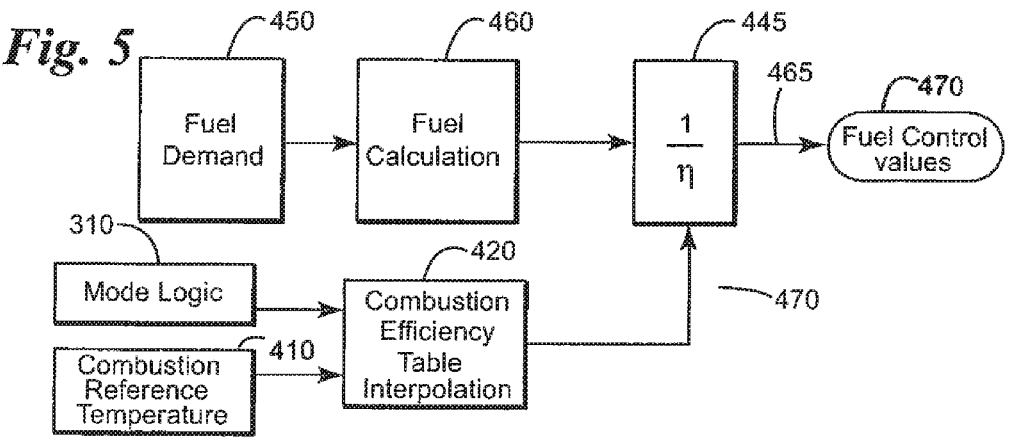
FIG. 5 illustrates use of combustor efficiency $\eta$ as a direct multiplier signal to modify the fuel demand signal in another embodiment of the invention.

In one embodiment, the combustion efficiency $\eta$ may be used as a bias signal to modify a fuel demand signal as illustrated in FIG. 4. Here the mode logic 310 and combustion reference temperature 410 are used in calculated combustion efficiency interpolation 420 producing $\eta$ 430, on a transient or steady state basis. The combustion efficiency $\eta$ is incorporated as a bias signal. The fuel demand bias signal 440 may be represented as $(1/\eta - 1)*(Fuel\ Demand)$. Added to the Fuel Demand signal 450, the result becomes $1/\eta * Fuel\ Demand$, whose technical effect is compensating for the efficiency of the combustion mode in the fuel valve stroke 465 sent to fuel control valves 470. Alternatively in another embodiment, the efficiency could be employed as a direct multiplier, as illustrated in FIG. 5. The mode logic 310 and the combustion reference temperature are used in calculated combustion efficiency interpolation 420 producing $\eta$ 430, on a transient or steady state basis. The combustion efficiency $\eta$ 430 is incorporated as a multiplier signal. The fuel demands multiplier signal 445 may be represented as $(1/\eta)*(Fuel\ Demand)$. Multiplying the Fuel Demand signal 450, the result becomes $1/\eta * Fuel\ Demand$, whose technical effect is compensating for the efficiency of the combustion mode in the fuel valve stroke 465 sent to fuel control valves 470.

While the mode efficiency corrections may desirably be used for operation with gas fuels, such corrections may also be used for mode transitions while employing liquid fuels. Such efficiency corrections may further be useful in transitions not related to mode changes where transitions may occur between use of fuels of various disparate energy content, resulting in significant changes in energy delivery to the combustors affecting combustion output and therefore, combustion reference temperature.

Referring again to FIG. 2, the plot 250 of relative combustion reference temperature versus time during a mode transfer, from more efficient combustion during a starting mode to less efficient combustion during an ending mode under an embodiment of the algorithm for combustion efficiency correction.

Initially on transfer, a prefill of fuel lines leads to an initial increase 260 in power and combustion reference temperature. During the transfer, the fuel demand signal is transiently compensated by a bias $\eta_{transient}$ as described above for the transfer to a ending mode with less efficient combustion from the more efficient combustion of the starting mode. The ending less-efficient combustion mode produces less power than in the starting mode, resulting in a drop in turbine reference temperature 265, but because the amount of fuel provided to the combustor increased due to the biased fuel demand signal, the transient drop 265 in temperature is less severe than the uncompensated transient 200 of FIG. 1. The reduced turbine reference temperature, along with the reduced turbine reference temperature urges the system controller to provide yet more fuel demand, which helps to turn the turbine reference temperature 270 and then drive it up. The turbine reference temperature then overshoots 275 on the high end. The transient cycles and smoothes out 280 with time at the turbine reference temperature called for in the ending mode.

Figure 6:
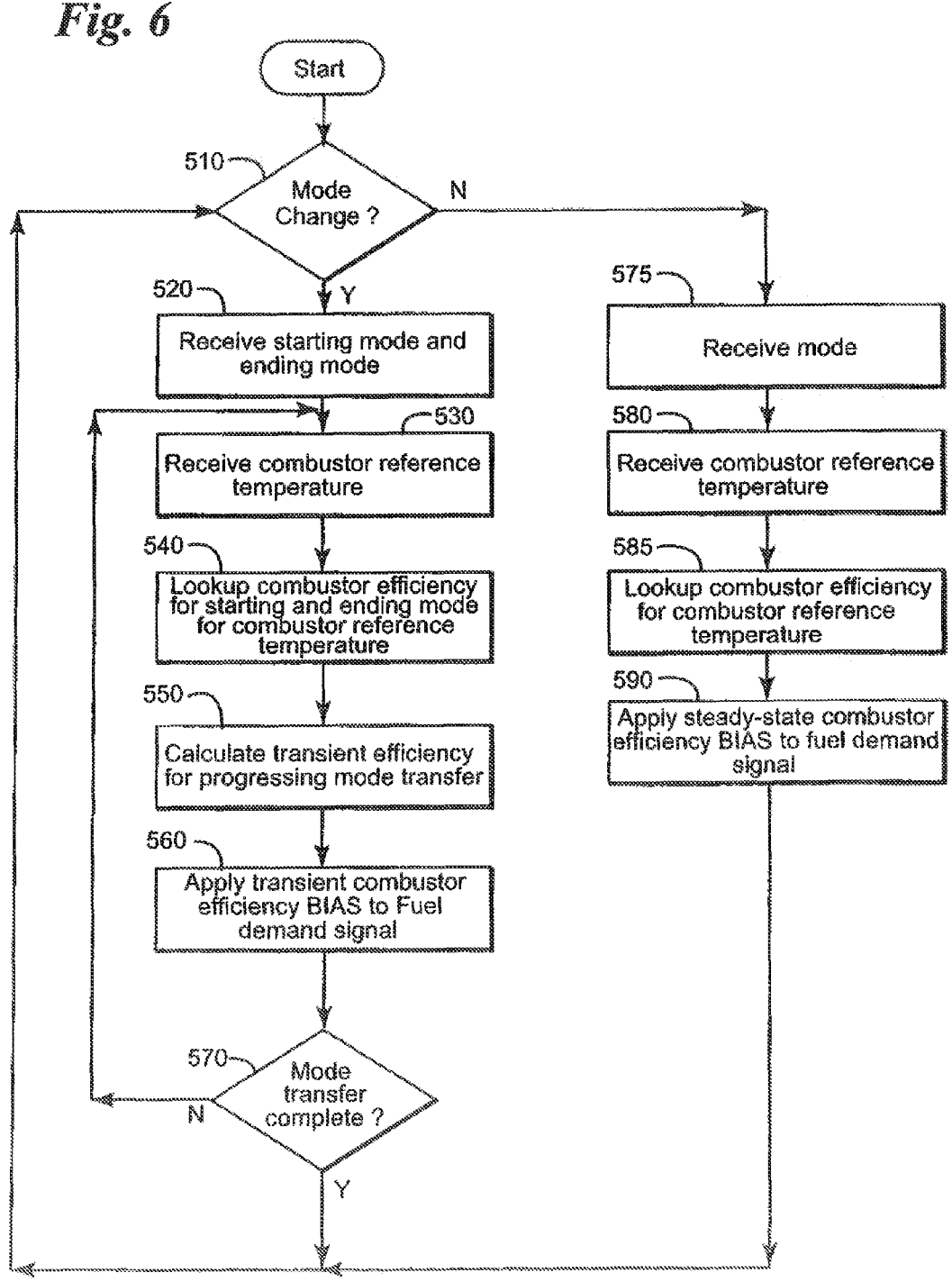
FIG. 6 illustrates a flow chart representing the method for compensating a fuel demand signal during mode transfers according to combustor efficiency according to an embodiment of the present invention.

FIG. 6 illustrates a flow chart representing the method for compensating a fuel demand signal during mode transfers according to combustion efficiency. The method invokes a control system for which reference data on combustion efficiency with respect to combustion reference temperature is encoded for each mode. In step 510, the system controller identifies the initiation of the mode change. In step 520 the starting mode and ending modes for the mode change are identified. In step 530, the current combustion reference temperature is supplied. In step 540, values for combustion efficiency in the starting mode and in the ending mode are determined according to a lookup table or transfer function for that may include an interpolation between values for combustion reference temperature. In step 550, a transient combustion efficiency is calculated for the mode transfer in progress. In step 560, the transient combustion efficiency is applied to bias the fuel demand signal. In response to the biased fuel demand signal, greater fuel is transiently supplied to the combustor when shifting to a less efficient combustion mode and less fuel is transiently supplied to the combustor when shifting to a more efficient combustion mode. A determination is made in step 560 if the mode transfer is complete. If the mode transfer is still in progress in step 570, then the steps 530-560 are repeated for providing a new transient efficiency bias for the fuel demand signal. In step 560 if the mode transfer is complete, then the process returns to step 510 to determine if a mode change is in progress. In step 575 if there is no mode change in progress, then the current mode status is received. In step 580, combustion reference temperature is received. In step 585, combustion efficiency in the current mode for the combustion reference temperature is looked up. The combustion efficiency is then applied in step 590 to bias the fuel demand signal.

While various embodiments are described herein, it will be appreciated from the specification that various combinations of elements, variations or improvements therein may be made, and are within the scope of the invention.

The invention claimed is:

1. A gas turbine system with operating modes of a combustion system of a gas turbine system, the gas turbine system comprising:
   a compressor, the combustion system and a turbine;
   a fuel control system;
   a turbine control system employing a mode logic for controlling operational parameters of the gas turbine system from a startup operating mode through a base load operating mode, the turbine control system comprising a controller configured to transmit a fuel demand signal from the turbine control system to the fuel control system, the controller comprising:

encoded information regarding combustion efficiency for each of the operating modes based on at least one reference parameter;

a processor configured to calculate a starting combustion efficiency for a starting operating mode among the operating modes and an ending combustion efficiency for an ending operating mode among the operating modes based on the encoded information; and to determine a bias to the fuel demand signal for operation between the starting operating mode and the ending operating mode based on the starting combustion efficiency and the ending combustion efficiency.

2. The gas turbine system according to claim 1, wherein the encoded information comprises information for operation with at least one of a gaseous fuel and a liquid fuel.

3. The gas turbine system according to claim 1, wherein the bias to the fuel demand signal according to the operating modes of the combustion system is a function of combustion reference temperature.

4. The gas turbine system according to claim 1, further comprising a numerical model in the turbine control system wherein the combustion efficiency is accessed.

5. The gas turbine system according to claim 4, wherein the numerical model in the turbine control system for efficiency comprises one of a lookup table, a transfer function, and a neural network.

6. The gas turbine system according to claim 5 wherein the numerical model accepts as input physical parameters that are determinant of combustion system performance.

7. The gas turbine system according to claim 1, the turbine control system comprising: a combustion efficiency calculation for the fuel control system under the starting operating mode and a combustion effiency calculation for the fuel control system under the ending operating mode.

8. The gas turbine system according to claim 7, wherein the fuel demand signal is biased according to:

$(1/\eta-1)*$Fuel Demand wherein $\eta$ is the combustion efficiency.

9. The gas turbine system according to claim 8 wherein the combustion efficiency comprises: a transient combustion efficiency $\eta_{transient}$ to the bias signal for fuel demand during a combustion mode change according to a progress of transistion between the starting combustion mode with a combustion efficiency of $\eta_{starting\ mode}$ and the ending combustion mode with a combustion efficiency of $\eta_{ending\ mode}$.

10. The gas turbine system according to claim 8, wherein a steady state combustion efficiency comprises the bias signal for fuel demand during steady state operation within a combustion mode.

* * * * *